United States Patent [19]
Shih

[11] Patent Number: 5,972,209
[45] Date of Patent: Oct. 26, 1999

[54] SYSTEM FOR CIRCULATING THE FINISHING FLUIDS OF ELECTRODE DISCHARGE MACHINE

[76] Inventor: Chiao-Chin Shih, P.O. Box 487, Changhua, Taiwan

[21] Appl. No.: 09/058,210

[22] Filed: Apr. 10, 1998

[30] Foreign Application Priority Data

Aug. 14, 1997 [TW] Taiwan ................................. 86111718

[51] Int. Cl.$^6$ .......................... B01D 17/12; B01D 17/025; B01D 36/04
[52] U.S. Cl. .......................... 210/85; 210/96.1; 210/104; 210/134; 210/171; 210/195.1; 210/266; 210/259
[58] Field of Search ............................ 210/96.1, 97, 104, 210/105, 109, 143, 167, 168, 171, 172, 194, 195.1, 257.1, 258, 259, 295, 662, 685, 800, 805, 806, 263, 663, 691, 799; 219/69.11, 69.12, 69.14, 69.15

[56] References Cited

U.S. PATENT DOCUMENTS

| | | | |
|---|---|---|---|
| 4,031,007 | 6/1977 | Sierra ........................................ | 210/104 |
| 4,361,488 | 11/1982 | White et al. .............................. | 210/799 |
| 4,584,150 | 4/1986 | Inoue ....................................... | 210/685 |
| 4,628,170 | 12/1986 | Furukawa ................................. | 210/805 |
| 4,802,978 | 2/1989 | Schmit et al. ........................... | 210/104 |
| 4,927,547 | 5/1990 | Backman ................................. | 210/791 |
| 5,071,567 | 12/1991 | Corcelle et al. ....................... | 210/195.1 |
| 5,464,959 | 11/1995 | Takahashi ................................ | 210/662 |

*Primary Examiner*—Joseph W. Drodge

[57] ABSTRACT

A circulation system is capable of dual functions of providing an electrode discharge machine with water or oil to serve as a finishing fluid for the process of drilling fine holes in a work piece of an aluminiumn, steel, or tungsten steel material. The circulation system comprises an oil-water separating tank, a water filtration tank, an oil filtration tank, a water purifying device, and a control computer. The water purifying device is connected in parallel with a discharge conduit from the water filtration tank for recirculating flow to the oil-water separating tank.

3 Claims, 3 Drawing Sheets

SYSTEM FOR CIRCULATING THE FINISHING FLUIDS OF ELECTRODE DISCHARGE MACHINE

FIELD OF THE INVENTION

The present invention relates generally to an electrode discharge machine for drilling a fine hole in the work piece, and more particularly to a fluid circulating system of the electrode discharge machine

BACKGROUND OF THE INVENTION

The water is generally used as a finishing fluid of the conventional electrode discharge machine in view of the fact that the finishing chore of a work piece of a steel material can be done rapidly, safely and economically. In addition, the finishing fluid of water is not detrimental to the environment. However, the use of water as the finishing fluid of the conventional electrode discharge machine is not suitable for drilling the fine holes in a work piece made of an altiminium or tungsten steel material because of the facts that the quality of water plays an important role in then stability of the conductivity of the fine holes, and that the fine holes can not be drilled with precision, and further that the water conductivity is so undermined as to prolong the drilling process. When the drilling process is done on a workpiece of an aluminum material, the water and the aluminiumn can be caused by the electric discharge to form the aluminiumn oxide on the surface of the workpiece, thereby resulting in the poor conductivity of the workpiece. The above shortcomings can be easily overcome by using the electrode discharge machine oil in place of water. However, the conventional electrode discharge machine is not provided with a fluid circulating system capable of dual functions of circulating water or oil interchangeably. It must be pointed out here that the use of oil as a finishing fluid of the electrode discharge machine can result in an increase in the cost of the drilling process as well as the risk of the environmental pollution.

SUMMARY OF THE INVENTION

The primary objective of the present invention is to provide an electrode discharge machine with a fluid circulating system capable of dual functions of circulating water or oil in an interchangeable manner. The fluid circulating system of the present invention is composed of a finishing fluid collection tank, a water-oil separating tank in which the water and the oil are separated, an oil filtration tank, a water filtration tank, and a finishing fluid switch device capable of discharging selectively the purified oil or water to facilitate the drilling of fine holes by the electrode discharge machine. The fluid circulating system of the present invention is capable of recycling the used fluid.

The objective, features, functions, and advantages of the present invention will be more readily understood upon a thoughtful deliberation of the following detailed description of an embodiment of the present invention with reference to the accompanying drawings.

DETAILED DESCRIPTION OF THE EMBODIMENT

Figure 1:
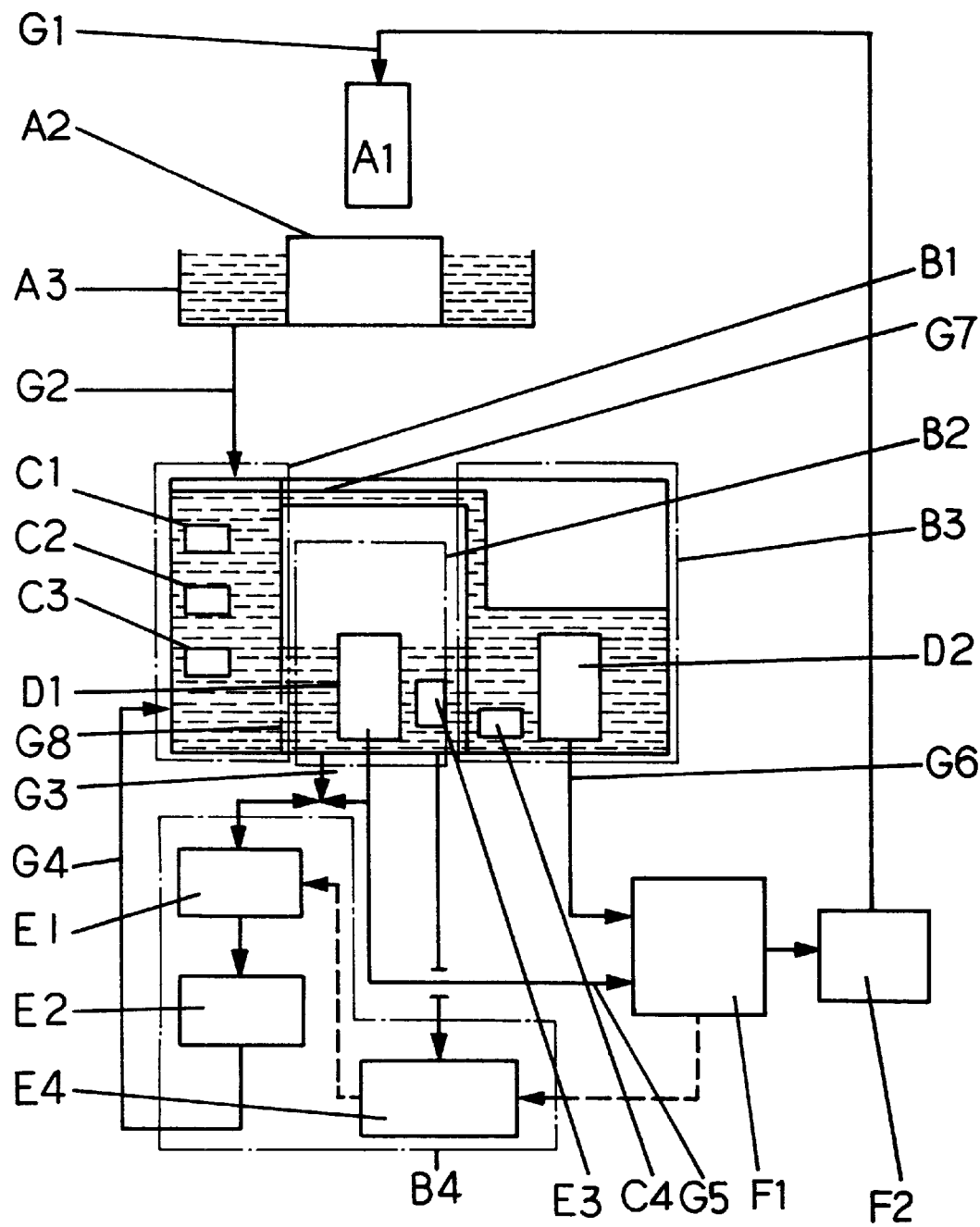
FIG. 1 shows a diagram of a fluid circulating system of the embodiment of tile present invention for use in the process of drilling fine holes with an electrode discharge machine.
Figure 2:
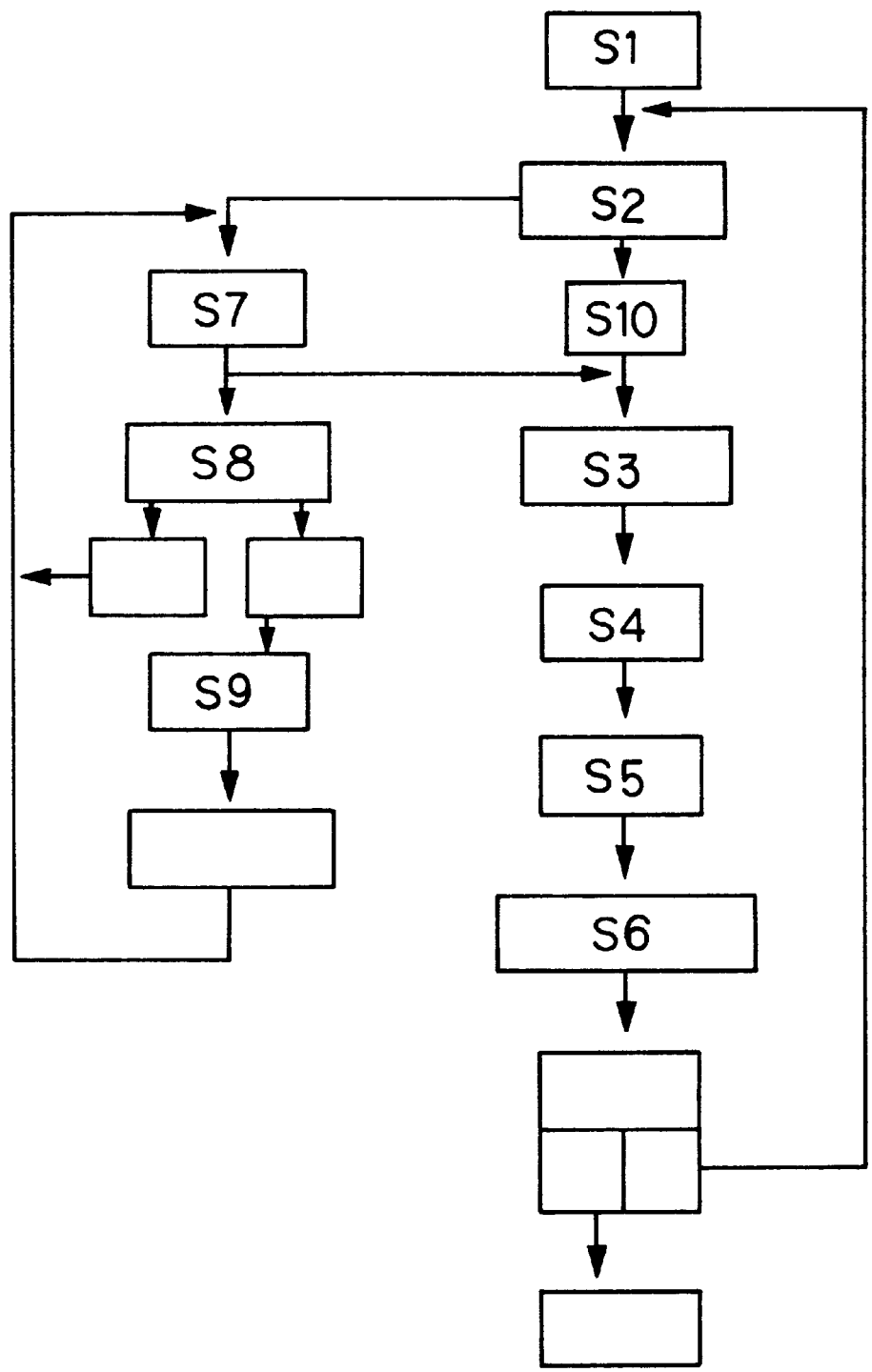
FIG. 2 shows a flow chart of the fluid circulating system of the present invention.
Figure 3:
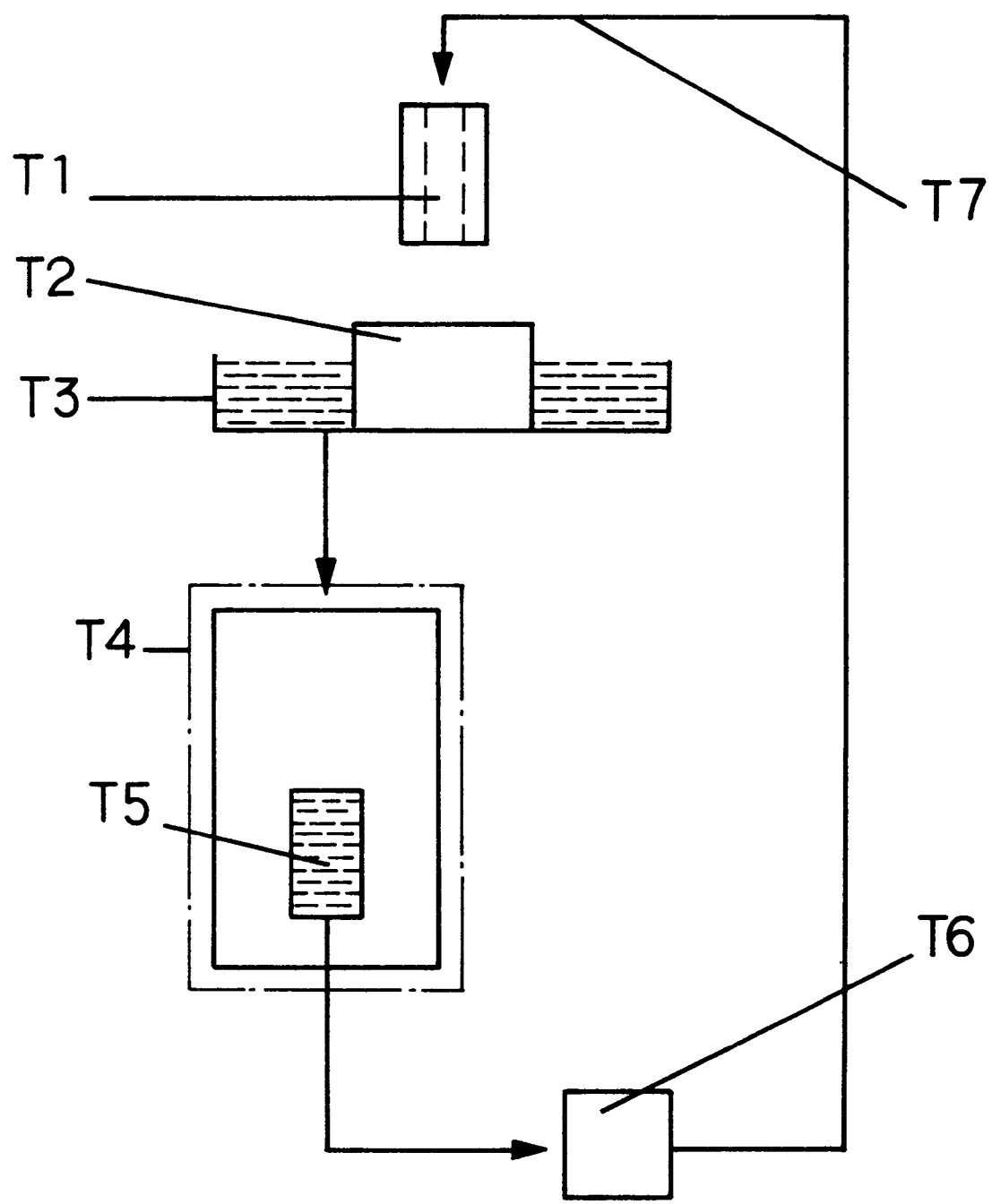
FIG. 3 shows a schematic diagram of a prior art system for circulating the finishing fluid in the process of drilling fine holes with an electrode discharge machine.

As illustrated an FIGS. 1 and 2, when a power source S1 of a fluid circulating system of the embodiment of the present invention is started, the water or oil is released selectively by a fluid switching device F1 in conjunction with a high pressure pump F2. The water or oil is then guided into the fine hole of a discharge head A1 via a guide tube G1. The finishing fluid is collected in a fluid collecting tank A3 from a work bench A2 before the fluid is guided into a oil-water separating tank B1 via a guide tube G2. The water is discharged from the bottom of the tank B1 into a water filtration tank B2 via a guide hole G8, whereas the oil is discharged from the upper portion of the tank B1 into an oil filtration tank B3 via a guide tube G7. The oil and the water are separated in the tank B1 in view of the fact that the oil and the water are different in density.

The process of purifying water is guided by a water sensor E3 capable of detecting the conductivity of the water when the value of the water conductivity is less than a predetermined value, a pump E1 is started to pump the water into an ion exchanging device E2 in which the action of purifying water is brought about. The purified water is then guided back into the water filtration tank B2 via a guide tube G4. If the value of the water conductivity is equal to or higher than the predetermined value, a control device E4 is triggered to shut off the pump E1 such that no more water is pumped into the ion exchanging device E2, and that the water purifying process is temporarily interrupted. As a result, the water conductivity is kept in a set range, so as to stabilize the operation of the discharge finishing of a fine hole.

The impurities in the water are removed by a water filtering screen D1 before water is guided into the fluid switching device F1. The impurities in the oil are removed by the filtering screen D2 before oil is guided into the fluid switching device F1. The water or the oil can be selectively discharged from the fluid switching device F1 into a high-pressure pump F2 via which the water or oil is injected into the discharge head A1 so as to complete a fluid circulation cycle.

The oil-water separating tank B1 is provided with a high water level sensor C1, an intermediate water level sensor C2, and a low water level sensor C3 for monitoring the water level so as to prevent the water in the tank B1 from flowing into the oil filtration tank B3 at such time when the water level is excessively high. In the meantime, the oil can be prevented from flowing into the water filtration tank B2 at such time when the water level is excessively low when a high water level is detected by the sensor C1, a high water level signal is transmitted by tile sensor C1 to a main control computer capable of sending out a warning signal. On the other hand, when a low water level is detected by the sensor C3, a low water level signal is transmitted by the sensor C3 to the main control computer capable of triggering a warning light to flash to alert the operator to replenish the tank with water. The sensor C2 is intended to facilitate the replenishing of water by alerting the operator that the water level has reached the intermediate level.

The oil filtration tank B3 is provided with a low oil level sensor capable of transmitting a signal to the main control computer at such time when the oil level is excessively low. The warning light is thus triggered to flash by the main control computer to alert tile operator.

The fluid circulating system of the present invention is suitable for use in drilling the fine holes in a workpiece made of a steel material, an aluminum material, or a tungsten steel material, in conjunction with an electrode discharge machine.

To sum tip, the fluid circulating system of the present invention has several advantages, which are described hereinafter.

The fluid circulating system of the present invention makes it possible for the electrode discharge machine to use the oil as the finishing fluid to drill the fine holes with precision in a workpiece made of a tungsten steel material.

The fluid circulating system of the present invention enables the electrode discharge machine to use the oil as the finishing fluid to drill the high-quality fine holes in a workpiece made of an aluminum material. The use of the oil as the finishing fluid can prevent the oxidation of the aluminum material of the workpiece. The oxidation of the aluminum material can hamper the conductivity of the fine holes.

The fluid circulating system of the present invention enables the interchangeable use of water as the finishing fluid in the process of drilling the fine holes in a work piece made of a steel material. The process of drilling the fine holes by the electrode discharge machine can be thus completed efficiently and economically.

The fluid circulating system of the present invention is provided with dual functions enabling an operator of the electrode discharge machine to select the water or oil as the finishing fluid before the operation of drilling the fine holes is started.

It must be noted here that FIG. 2 consists of a letter "s" which is co-nbliied with the Arabic numerals to denote the operational steps of the system of the present invention.

The embodiment of the present invention described above is to be deemed in all respects as being merely illustrative and not restrictive. Accordingly, the present invention may be embodied in other specific forms without deviating from the spirit thereof. The, present invention is therefore to be limited only by the scope of the following appended claim.

What is claimed is:

1. A system for circulating, interchangeably, oil and water which are used as the finishing fluids in the electrode discharge process of drilling a fine hole in a work piece of an aluminum, steel, or tungsten steel material, said system comprising:

an oil-water separating tank provided at an upper portion thereof with an oil outlet, and at a bottom portion thereof with a water outlet;

a water filtration tank in communication with said water outlet of said oil-water separating tank for filtering the water separated from the oil in said oil-water separating tank for use as a finishing fluid of an electrode discharge machine in a process of drilling a fine hole in a work piece made of a steel material such that tire filtered water is pumped by a pump of said water filtration tank to a discharge head of the electrode discharge machine;

an oil filtration tank in communication with said oil outlet of said oil-water separating tank for filtering the oil separated from the water in said oil-water separating tank for use as a finishing fluid of the electrode discharge machine in a process of drilling a fine hole in a work piece made of an aluminum or tungsten steel material such that the filtered oil is pumped by a pump of said oil filtration tank to the discharge head of the electrode discharge machine;

a water purifying device connected in parallel with a discharge conduit from said water filtration tank for recirculating flow to said oil-water separating tank, and comprising an ion exchanger, a water quality sensor, and a water quality controller; and a control computer for regulating water levels in said oil-water separating tank and said water filtration tank, and oil level in said oil filtration tank.

2. The system as defined in claim 1, wherein said oil-water separating tank is provided with a low water level sensor, an intermediate water level sensor, and a high water level sensor, which are in communication with said control computer.

3. File system as defined in claim 1, wherein said oil filtration tank is provided with a low oil level sensor in communication with said control computer.

* * * * *